US008519565B2

(12) United States Patent
Dozier et al.

(10) Patent No.: US 8,519,565 B2
(45) Date of Patent: Aug. 27, 2013

(54) GENERATOR SET CONTROL SYSTEM

(75) Inventors: Chad Eric Dozier, Washington, IL (US);
Edward Maurer Schroeder, Germantown Hills, IL (US); Matthew Lee Wagner, Dunlap, IL (US); Matthew Joseph Meinhart, Peoria, IL (US); Keith Ronald Folken, West Peoria, IL (US); Joydip Chakravarty, Chesterfield, MO (US); Douglas William Fisher, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 417 days.

(21) Appl. No.: 12/289,318

(22) Filed: Oct. 24, 2008

(65) Prior Publication Data

US 2010/0102637 A1   Apr. 29, 2010

(51) Int. Cl.
*H02J 3/38* (2006.01)

(52) U.S. Cl.
USPC .......................................................... 307/44

(58) Field of Classification Search
USPC .......................................................... 307/44
See application file for complete search history.

(56) References Cited

U.S. PATENT DOCUMENTS

| | | |
|---|---|---|
| 4,886,981 A | 12/1989 | Lentini et al. |
| 4,937,463 A | 6/1990 | Kobayashi et al. |
| 4,965,463 A | 10/1990 | Maruyama et al. |
| 5,390,068 A | 2/1995 | Schultz et al. |
| 6,639,331 B2 | 10/2003 | Schultz |
| 6,877,581 B2 | 4/2005 | Badr et al. |
| 6,927,499 B2 | 8/2005 | Hibi et al. |
| 2008/0179959 A1 | 7/2008 | Folken et al. |
| 2009/0096426 A1* | 4/2009 | Schaper et al. ............... 320/162 |

* cited by examiner

*Primary Examiner* — Rexford Barnie
*Assistant Examiner* — Dru Parries
(74) *Attorney, Agent, or Firm* — Finnegan, Henderson, Farabow, Garrett & Dunner LLP

(57) ABSTRACT

A control system is provided for use with a plurality of generator sets. The control system may have at least one load discrete signal cable, a ramping discrete signal cable, a switching device, and a control module associated with a first of the plurality of generator sets. The control module may be configured to detect a signal on the at least one load discrete signal cable generated by a second of the plurality of generator sets indicative of a load on the second of the plurality of generator sets, and to activate the switching device to implement an operational status change of the first of the plurality of generator sets based on the detection. The control module may also be configured to generate a signal on the ramping discrete signal cable to inhibit others of the plurality of generator sets from changing operational status during the operational status change of the first of the plurality of generator sets.

22 Claims, 2 Drawing Sheets

GENERATOR SET CONTROL SYSTEM

TECHNICAL FIELD

The present disclosure relates to a control system and, more particularly, to a control system for use with a generator set.

BACKGROUND

A generator set (genset) includes a combination of a generator and a prime mover, for example, a combustion engine. As a mixture of fuel and air is burned within the engine, a mechanical rotation is created that drives the generator to produce electrical power. Ideally, the engine drives the generator with a relatively constant torque and speed, and the generator accordingly produces an electrical power output having relatively constant characteristics (frequency, voltage, etc.).

In some applications the electrical power demanded of the genset is greater than can be supplied by a single genset and, thus, multiple gensets are connected in parallel to meet the demands in these situations. Preferably, the power demand remains relatively constant and all available gensets are continuously functional and each produces electrical power at optimum efficiency. However, in practice, the power demand fluctuates as loads are activated and deactivated, thereby requiring the number of gensets online at any given time to vary.

Historically, a single master controller monitored power demand and, based on the demand, either brought additional gensets online or moved them offline to meet the power demand in an efficient manner. Although functionally adequate, the master controller is very expensive and complicated. Thus, a lower cost, simpler alternative is desired.

U.S. Pat. No. 6,639,331 issued to Schultz, on Oct. 28, 2003 ("the '331 patent") discloses a parallel generator power system for connecting a plurality of generator sets to a common bus. The system includes a separate control module associated with each of the plurality of generator sets. And, in response to a signal to start more than one of the generator sets, each control module initiates operation of its associated generator set. When each of the generator sets is operational and ready for connection to the common bus, each generator set sends a ready-to-load signal to its corresponding control module. The control modules then arbitrate for the right to send the first start command to their generator set that will result in connection of the generator set to the common bus. In other words, all of the control modules as a whole determine which single one of the modules will allow its generator set to connect to the common bus, while inhibiting other generator sets from connecting to the bus. The arbitration process takes the form of hardware, electronics, and software in each connection module, and is configured so that a connection module only allows its associated generator set to connect to the common bus if the given module reaches its first start state before any other module. Only one generator set is allowed to connect to the common bus at a time, since its output must be synchronized in voltage, frequency, and phase.

Although the system of the '331 patent may provide a way to bring multiple generator sets online in a smooth and controlled manner without the use of a master controller, the system may still be suboptimal. That is, a main controller may still be required to determine when additional generators need to be brought online or moved offline, and to generate a corresponding signal directed to the individual control modules. Further, the arbitration process may require significant amounts of time, and delay connection of a ready generator set to the common bus.

SUMMARY

One aspect of the present disclosure is directed to a control system for use with a plurality of generator sets. The control system may include at least one load discrete signal cable associated with the plurality of generator sets, a ramping discrete signal cable associated with the plurality of generator sets, and a switching device configured to selectively connect a first of the plurality of generator sets to an external load. The control system may also include a control module connected to the switching device, the at least one load discrete signal cable, and the ramping discrete signal cable. The control module may be configured to detect a signal on the at least one load discrete signal cable generated by a second of the plurality of generator sets indicative of a load on the second of the plurality of generator sets, and to activate the switching device to implement an operational status change of the first of the plurality of generator sets based on the detection. The control module may also be configured generate a signal on the ramping discrete signal cable to inhibit others of the plurality of generator sets from changing operational status during the operational status change of the first of the plurality of generator sets.

A second aspect of the present disclosure is directed to a method of operating a plurality of generator sets connected in parallel to an external load. The method may include detecting a load on a first of the plurality of generator sets, and changing an operational status of a second of the plurality of generator sets based on the detection. The method may also include inhibiting other generator sets of the plurality of generator sets from changing operational status during the operational status change of the second of the plurality of generator sets.

DETAILED DESCRIPTION

Figure 1:
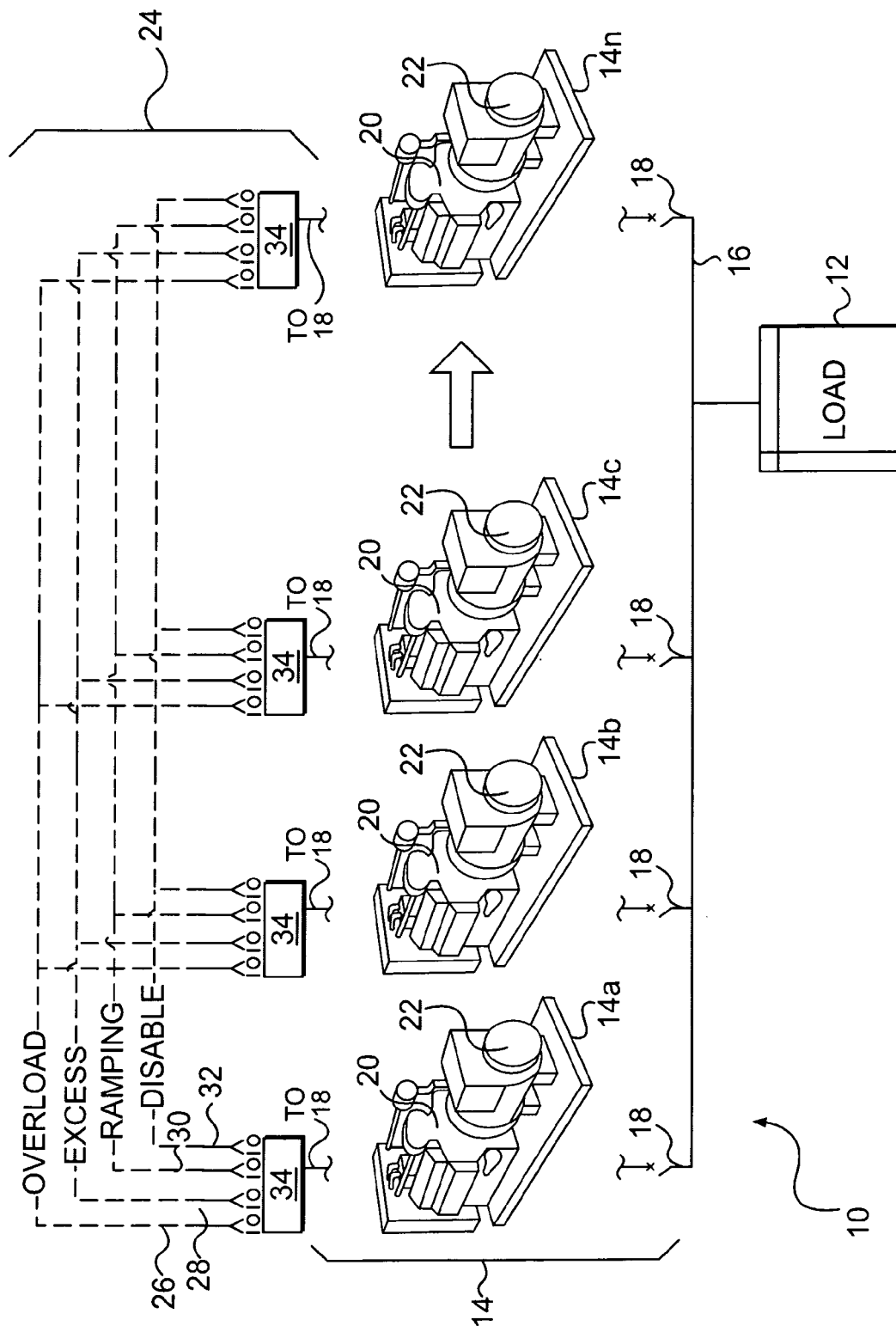
FIG. 1 is a schematic illustration of an exemplary disclosed power system.

FIG. 1 illustrates an exemplary power system 10 consistent with certain disclosed embodiments. Power system 10 may be configured to provide primary and/or backup power to an external load 12. In one exemplary embodiment, backup power may include an immediate supply of reserve power provided to external load 12 when power supplied from a utility power grid (not shown) is interrupted. As shown in FIG. 1, power system 10 may comprise a plurality of generator sets (gensets) 14, including gensets 14a, 14b, 14c, and 14n. Although intended for use with two or more gensets 14, it is contemplated that power system 10 may include any number of gensets 14. Gensets 14 may be connected to each other and connected to external load 12 by way of a power transmission network 16 and a plurality of connections 18.

External load 12 may include any type of power consuming system or device configured to receive electrical power supplied by gensets 14 and to utilize the electrical power to perform some type of task. External load 12 may include, for example, lights, motors, heating elements, electronic circuitry, refrigeration devices, air conditioning units, computer servers, etc. In one exemplary embodiment, external load 12 may include one or more systems and/or devices that utilize uninterrupted electrical power to perform one or more critical and/or sensitive tasks. For example, electrical loads 12 that utilize uninterrupted power may include those found in hospitals, airports, computer servers, telecommunication installations, and/or industrial applications.

Transmission network 16 may embody any electrical transmission system for distributing electrical power produced by gensets 14 to external load 12. For example, transmission network 16 may include a system comprised of power stations, transmission lines, connection equipment (e.g., transformers, electrical switches, power relays, circuit breakers, and the like), and other suitable devices for distributing electrical power across a power grid. In one embodiment, portions of transmission network 16 may be buried underground and/or run overhead via transmission towers.

Connections 18 may include any type of electrical connector or system that is capable of coupling together one or more of gensets 14 and external load 12. For example, connection 18 may include various switching devices, junction boxes, circuit interrupting devices, fuses, or any other components that may be suitable for electrically interconnecting one or more systems. Connection 18 may also or alternatively include a voltage transformer and/or power synchronizer configured to reduce or otherwise condition the power provided by gensets 14 to a suitable level for use by conventional consumer devices.

Gensets 14 may each include components that operate to generate electricity. In one embodiment, each genset 14 may comprise a prime mover 20 coupled to mechanically rotate a generator 22 that provides electrical power to external load 12. For the purposes of this disclosure, prime mover 20 is depicted and described as a heat engine, for example, a combustion engine that combusts a mixture of fuel and air to produce the mechanical rotation. One skilled in the art will recognize that prime mover 20 may be any type of combustion engine such as, for example, a diesel engine, a gasoline engine, or a gaseous fuel-powered engine.

Generator 22 may be, for example, an AC induction generator, a permanent-magnet generator, an AC synchronous generator, or a switched-reluctance generator that is mechanically driven by prime mover 20 to produce electrical power. In one embodiment, generator 22 may include multiple pairings of poles (not shown), each pairing having three phases arranged on a circumference of a stator (not shown) to produce an alternating current. Electrical power produced by generator 22 may be directed for offboard purposes to external load 12.

It is contemplated that one or more of gensets 14 may be substantially different from one or more others of gensets 14 within the same power system 10. That is, one or more of gensets 14 may have a greater or lesser electrical power output capacity than another of gensets 14. Subsequently, gensets 14 may each be operated and controlled differently, depending on their respective electrical power output, if desired.

To help regulate operation of gensets 14 and their connection to external load 12, power system 10 may be provided with a control system 24. Control system 24 may include a plurality of discrete signal cables, for example, an overload discrete signal cable 26, an excess capacity discrete signal cable 28, a ramping discrete signal cable 30, and a disable discrete signal cable 32. Control system 24 may also include a plurality of control modules 34 operatively connected to discrete signal cables 26-32 and to transmission network 16. In one embodiment, one control module 34 may be paired with and dedicated to controlling only one of gensets 14. It is contemplated, however, that each control module 34 could control a greater number of gensets 14, if desired.

Overload discrete signal cable 26 may extend between all of gensets 14 and be configured to transmit a signal from any one of gensets 14 to all other gensets 14 of the same power system 10 indicative of a load of the transmitting genset 14 exceeding a desired operating range. That is, each of gensets 14 may be designed to accommodate a range of electrical loading. When operating within this range, performance of genset 14 may be substantially consistent and efficient, and component life of genset 14 may be substantially unaffected. When a load on any one of gensets 14 exceeds the desired operating range, performance of genset 14 may become inconsistent, efficiency may worsen, and component life may be reduced. As such, when a load on any one of gensets 14 nears or surpasses a predetermined setpoint for that particular genset 14, a signal indicative of the loading may be generated on overload discrete signal cable 26 and sent to all other gensets 14 of power system 10. When the load on the transmitting genset 14 is reduced back to within the desired operating range, the signal may be removed from overload discrete signal cable 26.

Similarly, excess capacity discrete signal cable 28 may extend between all of gensets 14 and be configured to transmit a signal from any one of gensets 14 to all other gensets 14 of the same power system 10 indicative of a load of the transmitting genset 14 falling below the desired operating range. When a load on any one of gensets 14 falls below its desired operating range, performance thereof may become inconsistent, efficiency may worsen, and component life may be reduced. As such, when a load on any one of gensets 14 nears or falls below a predetermined setpoint for that particular genset 14, a signal indicative of the loading may be generated on excess capacity discrete signal cable 28 and sent to all other gensets 14 of power system 10. When the load on the transmitting genset 14 increases back into the desired operating range, the signal may be removed from excess capacity discrete signal cable 28.

Ramping discrete signal cable 30 may extend between all of gensets 14 and be configured to transmit a signal from any one of gensets 14 to all other gensets 14 of the same power system 10 indicative of an ongoing operational status change of the transmitting genset 14. That is, when any one of gensets 14 is ramping up in power (starting up), ramping down in power (shutting off), connecting to supply power to external load 12 via transmission network 16, or disconnecting to stop supplying power to external load 12, a signal indicative of the ongoing operational status change may be automatically generated and directed along ramping discrete signal cable 30 to all other gensets 14 of power system 10. In one example, a signal on ramping discrete signal cable 30 may override signals on either of overload or excess capacity cables 26, 28. That is, when a signal is detected on ramping discrete signal cable 30, signals on overload and excess capacity cables 26, 28 may be ignored or even removed from those cables.

Disable discrete signal cable 32 may extend between all of gensets 14 and be configured to transmit a signal to all gensets 14 of power system 10 indicative of normal or abnormal status. In particular, in response to a monitored power characteristic, for example a frequency of electrical power produced by any one of gensets 14, deviating from a desired characteristic, or in response to a disconnection of any one of cables 26-30, a signal may be automatically generated on disable discrete signal cable 32 and directed to each of gensets 14. In one example, a signal on disable discrete signal cable 32 may override signals on all other cables 26-30. That is, when a signal is detected on disable discrete signal cable 32, signals on overload, excess capacity, and ramping cables 26-30 may be ignored or even removed from those cables. This overriding disable signal cable may drive all available gensets 14 to respond per other external signals.

Each of control modules 34 may be configured to detect signals on any one of cables 26-32, to regulate operation of its paired genset 14 in response to the detected signals, and to generate signals on cables 26-32 directed to other gensets 14 within the same power system 10. Each control module 34 may embody a single or multiple microprocessors, field programmable gate arrays (FPGAs), digital signal processors (DSPs), etc. that include a means for controlling an operation of its paired genset 14 in response to various input. Numerous commercially available microprocessors can be configured to perform the functions of control module 34. Various other known circuits may be associated with control module 34, including power monitoring circuitry, power supply circuitry, signal-conditioning circuitry, actuator driver circuitry (i.e., circuitry powering solenoids, motors, or piezo actuators), communication circuitry, and other appropriate circuitry.

According to one embodiment, each control module 34 may be configured to adjust or change the operational status of its paired genset 14 based on signals detected on any one of discrete signal cables 26-32. For example, in response to a signal on overload discrete signal cable 26, each control module 34 of a currently offline genset 14 may trigger its paired genset 14 to power up in preparation for supplying power to external load 12 (i.e., each control module 34 may prepare its paired genset 14 to come online). Similarly, in response to a signal on excess capacity cable 28, each control module of a currently online genset 14 may trigger its paired genset to power down in preparation for stopping its supply of power to external load 12 (i.e., each control module 34 may prepare its paired genset 14 to go offline). Further, in response to a signal on ramping discrete signal cable 30, each control module of all other gensets 14 within power system 10 may inhibit its paired genset 14 from ramping power up, ramping power down, going online, or going offline. In addition, in response to a signal on disable discrete signal cable 32, each control module of all other gensets 14 within power system 10 may ignore signals on all other discrete signal cables. Once a genset 14 has ramped power up or down and is producing electrical power at a desired output level and no signals exist on either ramping or disable discrete signal cables 30, 32, the genset's paired control module 34 may automatically activate connection 18 to either connect or disconnect the respective genset 14 from external load 12.

In one embodiment, a delay may be associated with the operational status change of gensets 14. That is, after a signal on overload and/or excess capacity cables 26, 28 is received, each control module 34 may be configured to delay a set time period before triggering the operational status change (i.e., before power ramp up, power ramp down, connecting, or disconnect its paired genset 14). And, the set time period may be different for each genset 14. In one example, each genset 14 may be assigned a priority number, and the set time period may be a function of that priority number. For instance, genset 14a may have a set time period $f(a)$, genset 14b may have a set time period $f(b)$, genset 14c may have a set time period $f(c)$, and genset 14n may have a set time period $f(n)$. In this manner, even though all of control modules 34 may simultaneously detect a signal on any one of overload and excess capacity cables 26, 28, only one of control modules 34 may be allowed to change an operational status of its paired genset 14 at a given time due to the different built-in time delays.

In one embodiment, the time delays associated with operational status changes of gensets 14 may be related to an output capacity of each genset 14. That is, as mentioned above, some gensets 14 within power system 10 may have a different output capacity than other gensets 14 within power system 10. And, the time delay may be related to this output capacity such that gensets 14 having a lesser power output may have a shorter set time period for delay.

Each control module 34 may further be configured to generate a signal on any one of discrete signal cables 26-32 based on performance of its paired genset 14. For example, control module 34 may be equipped with a power monitor (not shown), for example a kilowatt meter that is configured to monitor an electrical power output of its paired genset 14. And, when the monitored electrical power output deviates from the desired operating range, control module 34 may generate a signal on one of overload and excess capacity cables 26, 28. For example, when the monitored electrical power output exceeds the desired operating range, control module 34 may request additional gensets 14 begin sharing the electrical burden of external load 12 by generating a signal on overload discrete signal cable 26. Similarly, when the monitored electrical power output falls below the desired operating range, control module 34 may request other gensets 14 that are currently sharing load to move offline by generating a signal on excess capacity discrete signal cable 28 such that the load on the remaining online gensets 14 is increased to within the desired operating range. When a genset 14 is transitioning between being online and offline (i.e., when genset 14 is changing operational status), the paired control module 34 may generate a signal on ramping discrete signal cable 30 such that no other genset 14 concurrently changes its operating status. Further, when an abnormality or fault with any one genset 14 occurs, the paired control module 34 may generate a signal on disable discrete signal cable 32. This overriding disable signal cable may drive all available gensets 14 to respond per other external signals.

Figure 2:
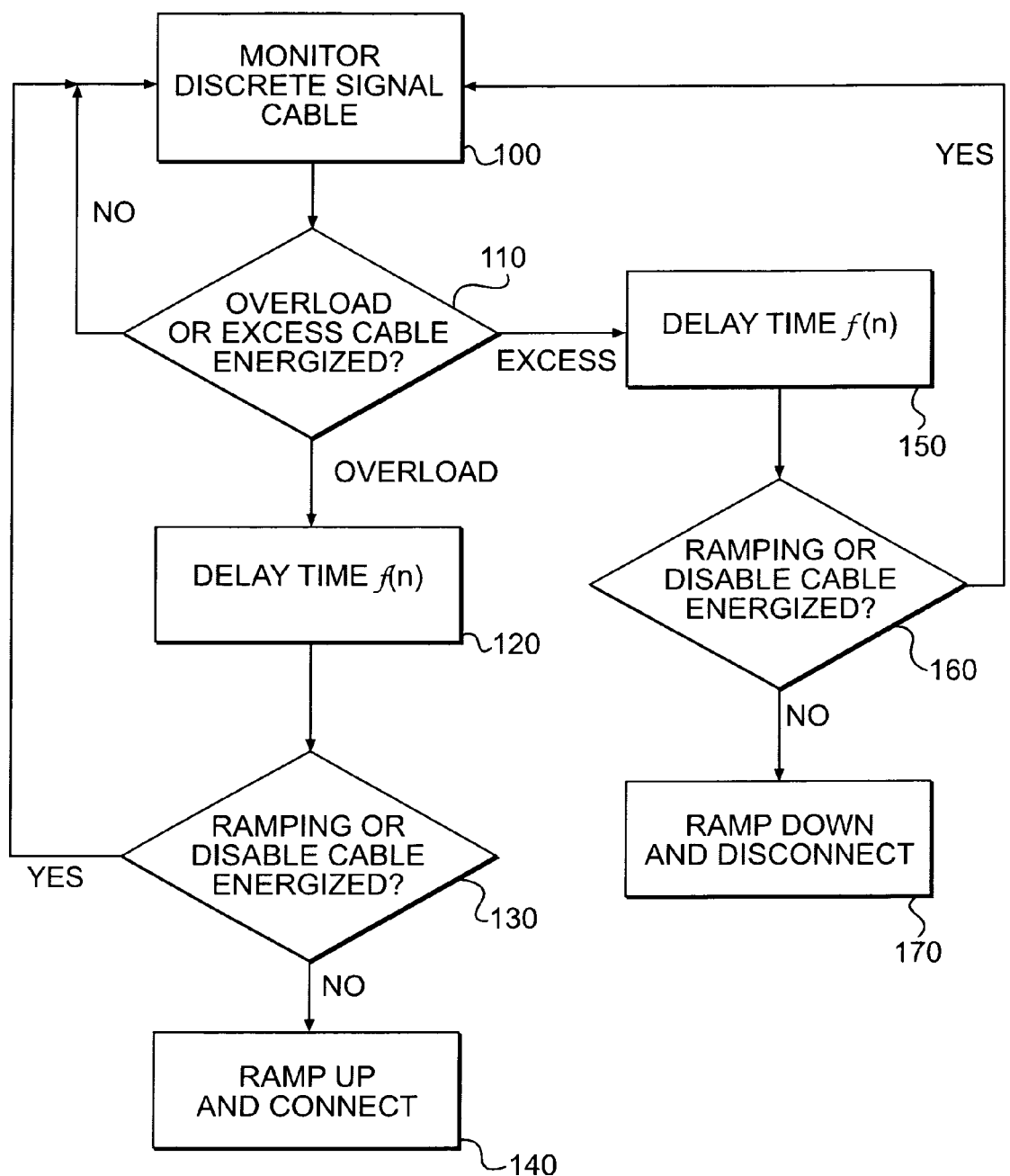
FIG. 2 is flowchart depicting an exemplary disclosed method of operating the power system of FIG. 1.

FIG. 2 illustrates an exemplary operation of power system 10. FIG. 2 will be discussed in more detail in the following section to further illustrate the disclosed concepts.

INDUSTRIAL APPLICABILITY

The disclosed power system may provide variable power supply to an external load in a low cost, simple manner. In particular, the disclosed power system may utilize multiple independent control modules to selectively bring gensets online and move them offline in response to a load on any one genset. The multiple independent control modules may have a lower cost and complexity than a single master controller, and help create modularity in the power system that allows for easy capacity expansion and retraction. Further, by adjusting operational status of the gensets based on a load of any one genset within the same power system, each genset may be operated within a desired range that results in high efficiency. FIG. 2 illustrates a flowchart depicting an exemplary method for operating power system 10 to provide varying levels of power to external load 12. FIG. 2 will now be discussed in detail.

During operation of power system 10, each control module 34 of each genset 14 may continuously monitor discrete signal cables 26-32 (Step 100). During this monitoring, each control module 34 may detect when a signal is generated on any one of overload and excess capacity discrete signal cables 26, 28 (Step 110), and respond accordingly. For example, if a signal is detected on overload discrete signal cable 26 (Step 110: Overload), each control module 34 may first delay the set time period ƒ(n) associated with its paired genset 14 (Step 120), and then check to see if a signal on ramping or disable discrete signal cables 30 or 32 is present (Step 130). If a signal on ramping or disable discrete signal cables 30 or 32 exists (Step 130: YES) (i.e., if another genset 14 is already responding to the load change), control may return to step 100 without further action. However, if at step 130 control module 34 does not detect a signal on one of ramping and disable discrete signal cables 30 or 32 (Step 130: NO), control module 34 may change the operational status of its paired genset 14, ramping up power output thereof and connecting the power output to external load 12 via connection 18 (Step 140).

Returning to step 110, if a signal is detected on excess capacity discrete signal cable 28 (Step 110: Excess), control module 34 may delay the set time period associated with its paired genset 14 (Step 150) before taking further action. It is contemplated that the set time period for responding to an overload signal may be different than the set time period for responding to an excess capacity signal, if desired. After the set time period has expired, control module 34 may then check to see if a signal on ramping or disable discrete signal cables 30 or 32 is present (Step 160). If a signal on ramping or disable discrete signal cables 30 or 32 exists (Step 160: YES), control may return to step 100 without further action. However, if at step 160 control module 34 does not detect a signal on one of ramping and disable discrete signal cables 30 or 32 (Step 160: NO), control module 34 may change the operational status of its paired genset 14, ramping down power output thereof and disconnecting the power output from external load 12 via connection 18 (Step 170).

It will be apparent to those skilled in the art that various modifications and variations can be made in the disclosed control system without departing from the scope of the disclosure. Other embodiments of the disclosed control system will be apparent to those skilled in the art from consideration of the specification and practice of the control system disclosed herein. It is intended that the specification and examples be considered as exemplary only, with a true scope of the disclosure being indicated by the following claims.

What is claimed is:

1. A control system for use with a plurality of generator sets configured to provide power to an external load, each generator set of the plurality of generator sets being associated with a delay time and configured to have an operational status of an online mode or an offline mode, the online mode being a mode in which the generator set provides power to the external load, the offline mode being a mode in which the generator set does not provide power to the external load, and the delay time being a measure of time the generator set takes before it triggers its operational status change after detecting a signal, the control system comprising:
    a plurality of cables electrically coupling the plurality of generator sets, the plurality of cables including:
        at least one load discrete signal cable, the load discrete signal cable being configured to transmit a signal that indicates that a load on a generator set in the online mode is outside a desired operating range;
        a ramping discrete signal cable, the ramping discrete signal cable being configured to transmit an inhibition signal that indicates an ongoing operational status change of a generator set of the plurality of generator sets;
    a switching device configured to selectively connect each generator set of the plurality of generator sets to the external load; and
    at least one control module connected to the switching device and the plurality of cables, the at least one control module being configured to:
        detect a signal on the at least one load discrete signal cable and trigger an operational status change on a triggered generator set in response to the detection, the triggered generator set being one of (a) each generator set operating in the online mode, or (b) each generator set operating in the offline mode;
        activate the switching device to implement the operational status change on a first generator set of the triggered generator set, the first generator set being a generator set having the lowest delay time; and
        generate the inhibition signal on the ramping discrete signal cable to inhibit other generator sets of the plurality of generator sets from changing their operational status during the operational status change of the first generator set.

2. The control system of claim 1, wherein the at least one load discrete signal cable includes an overload discrete signal cable and an excess capacity discrete signal cable, the overload discrete signal cable being configured to transmit a signal that indicates that a load on a generator set in the online mode exceeds a desired operating range, and the excess capacity discrete signal cable being configured to transmit a signal that indicates that a load on a generator set in the online mode is below the desired operating range.

3. The control system of claim 2, wherein the control system is configured to detect a signal on the overload discrete signal cable and change the operational status of the first generator set from the offline mode to the online mode.

4. The control system of claim 1, wherein a signal on the ramping discrete signal cable overrides a signal on the at least one load discrete signal cable.

5. The control system of claim 4, wherein the signal on the ramping discrete signal cable is automatically generated in response to activation of the switching device.

6. The control system of claim 1, wherein the plurality of cables further includes a disable discrete signal cable, the disable discrete signal cable being configured to transmit a signal indicates an abnormal operation of a generator set of the plurality of generator sets.

7. The control system of claim 6, wherein the signal on the disable discrete signal cable is automatically generated based on an occurrence of an undesired electrical power output from a generator set of the plurality of generator sets.

8. The control system of claim 1, wherein:
    the at least one control module is a first control module configured to control operation of only the first generator set;
    each of the other generator sets of the plurality of generator sets is paired with a different dedicated control module; and
    the delay time is different for each generator set of the plurality of generator sets.

9. The control system of claim 8, wherein each generator set of the plurality of generator sets have different output capacities, and the delay time is shorter for those generator sets of the plurality of generator sets having a lower output capacity.

10. The control system of claim 8, wherein each generator set of the plurality of generator sets in the offline mode is simultaneously triggered to change its operational status in response to detection of the signal.

11. The control system of claim 10, wherein the signal on the at least one load discrete signal cable is removed when load on the generator set that caused the signal returns to the desired operating range.

12. The control system of claim 1, wherein the control system is configured to detect a signal on the load discrete signal cable and change the operational status of the first generator set from the online mode to the offline mode to decrease the power provided to the external load.

13. The control system of claim 6, wherein a signal on the disable discrete signal cable overrides a signal on the at least one load discrete signal cable and the ramping discrete signal cable.

14. A method of operating a plurality of generator sets connected in parallel to an external load, each generator set of the plurality of generator sets being associated with a delay time which is reflective of an amount of time the generator set takes before it triggers its operational status change after detecting a signal, and configured to have an operational status of an online mode or an offline mode, the online mode being a mode in which the generator set provides power to the external load, the offline mode being a mode in which the generator set does not provide power to the external load, the method comprising:
    detecting a load outside a desired operating range on a generator set of the plurality of generator sets in the online mode;
    triggering an operational status change on a triggered generator set in response to the detection, the triggered generator set being one of (a) each generator set operating in the online mode, or (b) each generator set operating in the offline mode;
    changing the operational status of a first generator set of the triggered generator set, the first generator set being a generator set having the lowest delay time; and
    inhibiting other generator sets of the plurality of generator sets from changing their operational status during the operational status change of the first generator set by sending an inhibition signal to all of the other generator sets.

15. The method of claim 14, wherein detecting a load outside a desired operating range includes detecting a signal on one of a plurality of cables interconnecting the plurality of generator sets, the plurality of cables including an overload discrete signal cable and an excess capacity discrete signal cable, the overload discrete signal cable being configured to transmit a signal that indicates that a load on a generator set in the online mode exceeds a desired operating range, and the excess capacity discrete signal cable being configured to transmit a signal that indicates that a load on a generator set in the online mode is below the desired operating range.

16. The method of claim 14, wherein the delay time associated with each generator set of the plurality of generator sets is different.

17. The method of claim 14, wherein each generator set of the plurality of generator sets have different output capacities, and the delay time is shorter for those generator sets having a lower output capacity.

18. The method of claim 14, wherein triggering an operational status change includes simultaneously triggering an operational status change on each generator set of the triggered generator set.

19. A power system, comprising:
    a plurality of generators connected in parallel to an external load, each generator of the plurality of generators being associated with a delay time and configured to have an operational status of (a) an online mode or (b) an offline mode, the online mode being a mode in which the generator provides power to the external load, the offline mode being a mode in which the generator does not provide power to the external load, and the delay time being a measure of time the generator takes before it triggers its operational status change after detecting a signal; and
    a control system configured to control the operation of the plurality of generators, the control system being configured to:
        detect a load outside a desired operating range on a generator of the plurality of generators in the online mode;
        trigger an operational status change on a triggered set of generators in response to the detection, the triggered set being one of (a) each generator operating in the online mode, or (b) each generator operating in the offline mode;
        change the operational status of a first generator of the triggered set, the first generator being a generator having the lowest delay time; and
        direct an inhibit signal to all other generators of the triggered set to prevent their operational status change during the operational status change of the first generator.

20. The power system of claim 19, wherein the delay time of each generator of the plurality of generators is a function of its output capacity.

21. The power system of claim 19, wherein the plurality of generators are connected together by a plurality of cables, the plurality of cables including:
    at least one load discrete signal cable, the load discrete signal cable being configured to transmit a signal that indicates that a load on a generator in the online mode is outside a desired operating range; and
    a ramping discrete signal cable, the ramping discrete signal cable being configured to transmit the inhibit signal.

22. The power system of claim 21, wherein the at least one load discrete signal cable includes:
    an overload discrete signal cable, the overload discrete signal cable being configured to transmit a signal that indicates that a load on a generator in the online mode exceeds the desired operating range; and
    an excess capacity discrete signal cable, the excess capacity discrete signal cable being configured to transmit a signal that indicates that a load on a generator in the online mode is below the desired operating range.

* * * * *